ABSTRACT

Disclosed are azidoformate-isocyanate compounds of the formula

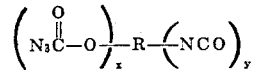

where R is a polyvalent organic radical and $x$ and $y$ are integers from 1 to 100. The use of said azidoformate-isocyanate compounds to modify polymers, cross-link polymers, and adhere polymers to substrates selected from siliceous materials, metals and other polymer substrates is disclosed. Also disclosed are rubber tires reinforced with polyester tire cord which has bene modified with an azidoformate-isocyanate compound.

5 Claims, No Drawings

AZIDOFORMATE-ISOCYANATE COMPOUNDS AND THEIR USES

This application is a division of my copending U.S. application Ser. No. 860,034, filed Sept. 22, 1969, now U.S. Pat. No. 3,676,466.

The unique compounds of this invention are represented by the formula

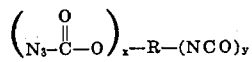

wherein R is a polyvalent organic radical and $x$ and $y$ are intergers broadly each being 1 to 100, preferably each being 1 to 10. Generally, R will be selected from the group consisting of the saturated and unsaturated aliphatic, cycloaliphatic, and aromatic hydrocarbon, hydrocarbon-oxy-hydrocarbon, hydrocarbon-thio-hydrocarbon and hydrocarbon-sulfonyl-hydrocarbon polyvalent radicals and the corresponding halo-substituted radicals. In preferred embodiments of this invention R will be an organic radical selected from the group consisting of radicals derived by the removal of two or more hydrogen atoms from alkanes, such as, for example, ethane, propane, butane, isobutane, pentane and its isomers, hexane and its isomers, octane and its isomers, decane and its isomers, dodecane and its isomers, octadecane and its isomers, and the like; cycloalkanes, such as, for example, cyclopropane, cyclobutane, cyclopentane, cyclohexane, cyclooctane, and the like; alkylcycloalkanes such as, for example, ethylcyclohexane, methylcyclobutane, and the like; arylenes, such as, for example, benzene, naphthalene, biphenyl, and the like; alkyl-substituted arylenes, such as, for example, toluene, ethylbenzene, o-, m- and p-xylene, o-, m- and p-diethylbenzene and the like; alkylene-diarylenes, such as, for example, diphenylmethane, 1,2-diphenylethane, 1,1-diphenylpropane, 1,3-diphenylpropane, 2,2-diphenylpropane, and the like, dialkylcycloalkanes, such as, for example, 1,2-, 1,3- and 1,4-dimethylcyclohexane, 1,2- and 1,3-dimethylcyclopentane and the like; and the alkyloxyalkanes, aryloxyarylenes, alkaryloxyarylenes, alkaryloxyalkarylenes, aralkyloxyalkanes, aralkyloxyaralkanes, and the like; as well as the corresponding thio- and sulfonyl compounds, specific examples of which include diethyl ether, propyl butyl ether, diphenyl ether, oxy-bis(p-methyl benzene), dibenzyl ether, diethyl sulfide, diphenyl sulfide, dibenzyl sulfide, dibutyl sulfone, and the like compounds; and the foregoing compounds with fluoro, chloro, bromo, and iodo substituents. It will of course, be obvious to those skilled in the art that R can contain other functional groups, which are substantially inert to the reactions in which these compounds are used, such as, esters, amides, etc. When an azido-formate-isocyanate compound of this invention is to be used as a coupling or cross-linking agent for polymers, R preferably will be substantially inert to the coupling or cross-linking reaction.

Specific compunds of this invention represented by the foregoing generic formula include:
4-isocyanatobutyl azidoformate
5-isocyanatopentyl azidoformate
m-isocyanatophenyl azidoformate
p-isocyanatophenyl azidoformate
3-(4-isocyanatophenoxy)propyl azidoformate
p-(2-isocyanatoethyl)phenyl azidoformate
4-isocyanatocyclohexyl azidoformate
4-(2-isocyanatoethyl)cyclohexyl azidoformate
11-isocyanatoheptadecyl azidoformate
7,12-diisocyanatooctadecyl azidoformate
5-isocyanatonane-1,9-diazidoformate
4-azidorcarbonyloxybutyl-4'-isocyanatobutyl sulfone.

The azidoformate-isocyanate compunds of this invention range from liquids to solids at room temperature and atmospheric pressure. They have characteristic infrared spectra, containing a strong azide band at about 2,140 cm$^{-1}$, a strong carbonyl band at around 1,735 cm$^{-1}$ and an isocyanate band at about 2270 cm$^{-1}$. The azidoformate radicals of the compounds of this invention become reactive when heated. As the temperature increases the overall decomposition rate of the azidoformates increases. The isocyanate portion of these compounds on the other hand, is quite heat stable, thus the azidoformate radicals can be decomposed by heating without affecting the isocyanate radicals. The azide radicals readily react with receptive polymers and combine therewith. They also combine with ethylenically unsaturated hydrocarbon groups in a variety of compounds. The isocyanate radicals can react at room temperature with water, amines and alcohols.

The azidoformate-isocyanate compounds of this invention can be prepared by various methods for example, they can be prepared from the corresponding hydroxy-carboxylic acid compounds by reaction with phosgene, thionyl chloride, sodium azide and finally heating to rearrange the carbonyl azide to the isocyanate. This preparation can be shown as follows:

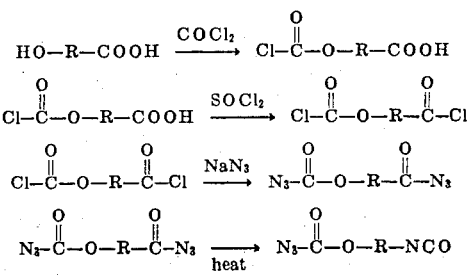

where R is as defined above. The first step in the preparation, comprising the reaction of the hydroxy-carboxylic acid compound with phosgene, is usually carried out at a temperature of from about 0°C. to about 20°C. in an inert solvent such as methylene chloride, ethylene dichloride, toluene, xylene, etc. The second step in the preparation comprising the reaction with thionyl chloride, is generally carried out at a temperature of from about 20°C. to about 100°C. with an excess of the thionyl chloride acting as a solvent or with some inert solvent such as one of the organic solvents recited above. The third step in the preparation, comprising the reaction with the sodium azide, is generally conducted at a temperature below 10°C. in a mixed solvent such as acetone-water, ethyl alcohol-water, methylene chloride-acetone-water, benzene-acetone-water, etc. The final step in the preparation, comprising the rearrangement of the carbonyl azide to the isocyanate, is carried out at temperatures up to 100°C. in an inert solvent such as benzene, toluene, etc.

As indicated above, this invention includes the use of the unique azidoformate-isocyanate compounds in modifying polymers, cross-linking polymers, and improving the adhesion of polymers to various substrates. All of these modifications of the invention involve the reaction of the azidoformate portion or portions of the azidoformate-isocyanate compounds with a receptive polymer. In this specification receptive polymer means a polymer having in each polymer chain at least one and generally more than one momomer unit capable of combination reaction with an azidoformate radical of a compound of this invention, whereby the residue of the compound is chemically bonded to the polymer. Nearly all polymers are receptive polymers. Preferred examples of a receptive polymer include all types of hydrocarbon polymers including saturated and unsaturated, linear and non-linear, crystalline and amorphous homopolymers, copolymers, terpolymers, and the like; for example, polyethylene, polypropylene, polystyrene, styrene-butadiene rubber, butyl rubber, natural rubber, polybutadiene, polyisobutylene, ethylene—propylene copolymer, cis-1,4-polyisoprene, ethylene—propylene—dicyclopentadiene terpolymer and the like; and blends of these polymers with each other and blends of these polymers with organic non-hydrocarbon polymers. In addition to the hydrocarbon polymers preferred examples of a receptive polymer include a large number of organic non-hydrocarbon polymers including homopolymers, copolymers, terpolymers, and the like. Typical of these organic non-hydrocarbon polymers are cellulose esters, such as, for example, cellulose acetate-butyrate, cellulose-acetate-propionate, cellulose acetate, cellulose propionate, cellulose butyrate, and the like; polyesters such as poly(ethylene glycol terephthalate), drying and non-drying alkyd resins and the like; poly(alkylene oxide) polymers such as poly(ethylene oxide), poly(propylene oxide) poly(ethylene oxide-propylene oxide); polyamides such as nylon, and the like; allyl pentaerythritol derivatives such as, for example, the condensate of triallyl pentaerythritol with diallylidene pentaerythritol, esters of triallyl pentaerythritol and drying oil fatty acids, and the like; poly(vinyl alkyl ethers) such as, for example, poly(vinyl methyl ether) and the like; poly(vinyl acetals) such as, for example, poly(vinyl butyral) and the like; vinyl chloride polymers having a vinyl chloride content of at least 10 mole percent such as, for example, poly(vinyl chloride), vinyl chloride—vinyl acetate copolymers, vinyl chloride—vinylidene chloride copolymers, vinyl chloride—vinyl acetal copolymers, such as, for example, the vinyl chloride—vinyl butyral copolymers, vinyl chloride—vinylidene chloride—acrylonitrile terpolymers and the like; nitrocellulose; chlorinated natural rubber; sulfochlorinated polyethylene; polysulfide rubber; polyurethane rubber; poly(vinyl acetate); ethylene—vinyl acetate copolymers, poly (vinylidene chloride); vinylidene chloride—acrylonitrile co-polymers; ethyl acrylate—2-chloroethyl vinyl ether copolymers; poly(ethyl acrylate); poly(ethyl methacrylate); poly[3,3-bis (chloromethyl)oxetane]; vinyl modified poly(dimethyl siloxane); polychloroprene; butadiene—acrylonitrile copolymers; and the like.

The modified polymers of this invention resulting from the reaction of the azodiformate portion or portions of the azidoformate-isocyanate compounds with the above receptive polymers are both useful in themselves and necessary intermediates in further modifications of this invention. The amount of azido-formate-isocyanate compound used to modify a receptive polymer will depend upon the modification desired and the desired end use. In general, however, the amount will be from about 0.01 percent to about 40 percent by weight based on the weight of the polymer. The resulting modified polymers are quite stable as long as they are kept dry. They exhibit new and improved static properties, adhesion properties, launderability, etc.

Modification can be carried out by admixing the required amount of azidoformate-isocyanate compound with a receptive polymer and heating to a temperature sufficient to react the azidoformate portion or portions of the compound with the polymer. This temperature will be in the range of from about 80°C. to about 200°C. In some cases it may be desirable to use an azidoformate-carbonyl azide intermediate which when heated rearranges to form the corresponding azidoformate-isocyanate compound. The use of the intermediate is particularly advantageous in the presence of water. Since the carbonyl azide groups do not react with water, the intermediate can be used in the form of an aqueous dispersion. Then the water can be removed by evaporation before heating to rearrange the carbonyl azide groups to isocyanate groups. The rearrangement occurs at a temperature in the range of from about 30°C. to about 80°C.

In one modification of this invention the azidoformate-isocyanate compounds are used to cross-link, i.e., vulcanize, receptive polymers. To effect cross-linking the receptive polymer is first modified by reaction with an azidoformate-isocyanate compound as described above and then treated with a poly-functional compound which reacts with the free isocyanate groups on the polymer. Various poly-functional compounds can be used in this cross-linking, however, most preferred are the polyamines such as diethylene triamine, m-phenylene diamine, 4,4'-methylene dianiline, ethylene diamine, etc. and the polyalcohols such as 1,4-butanediol, ethylene glycol, triethylene glycol, trimethylolpropane, etc. When using one of these compounds the amino groups or hydroxyl groups are believed to react with free isocyanate groups tying together, i.e., cross-linking the polymer chains. Instead of using a polyfunctional compound which is believed to react with the free isocyanate groups, one may use water which converts some of the free isocyanate groups to amines. The resulting amines are believed to react with the remaining isocyanate groups cross-linking the polymer chains.

In another modification of this invention the azidoformate-isocyanate compounds are used to bond various polymers to certain substrates selected from siliceous materials, metals, and other polymers. A typical example of the bonding process of this invention is the bonding of poly(ethylene terephthalate) tire cord to rubber tire stock. The said polyester tire cord is first modified with the azidoformate-isocyanate compound. In so doing it is believed that azido portion or portions react with the polyester leaving the isocyanate portion or portions free for later reactions. Next the tire cord may be treated with a standard industrial dip which is compatible with the rubber in which the cord is to be embedded. The dip is a conventional tire cord adhesive essentially comprising a mixture of a phenol-aldehyde resin and a rubber latex. If desired, the dip in the conventional tire cord adhesive can be omitted with a proportionate decrease in adhesive strength. Finally, the thus treated tire cord is embedded in a commercial vulcanizable tire stock and cured. While polyester tire cords are mentioned various other synthetic fibers useful as tire cords can be incorporated in rubber tire stock in accordance with this invention. Such other tire cords are for example, polyolefins, polyamides, polycarbonates and rayon fibers. Improved adhesion of the synthetic fibers to rubber can be obtained by the process of this invention no matter what the physical form of these fibers. The tire cord can be treated with the azidoformate-isocyanate compound by any conventional means, for example by dipping, spraying, brushing, or running the cord over a coated roll with a solution of the azidoformate-isocyanate compound in a suitable liquid. Exemplary of suitable organic solvents for the azidoformate-isocyanate compounds are trichloroethane, acetone, ethylene dichloride, benzene, toluene, methyl ethyl ketone, etc. After the azidoformate-isocyanate is applied to the cord, the coated cord is heated to a temperature above the decomposition point of the azidoformate groups resulting in modification of the cord. Various amounts of the azidoformate-isocyanate treating compound can be used. The optimum amount will depend upon the amount of modification of the cord desired, the specific azidoformate-isocyanate used, etc. In general, the amount added, based on the cord, will be from about 0.5 to about 2.0 percent by weight. As indicated above, the thus modified tire cord may be treated with a conventional tire cord adhesive. This adhesive comprises a mixture of a resin, preferably prepared from resorcinol and formaldehyde, admixed with a latex, which is basically a styrene—butadiene—vinyl pyridine terpolymer. The vinyl pyridine content of the terpolymer, is usually from about 5 to about 25 percent, the styrene content from about 5 to about 35 percent, and the butadiene content from about 50 to about 85 percent. In some cases it may be desirable to add a small amount of a latex of the polymer comprising the rubber tire stock. For example, if the rubber tire stock is an ethylene—propylene—diene terpolymer, it may be desirable to add a small amount of a latex prepared from that terpolymer to the styrene—butadiene—vinyl pyridine terpolymer latex. If the rubber tire stock contains styrene—butadiene rubber there is, of course, no need to add styrene—butadiene latex to the terpolymer latex. The latex is applied to the modified tire cord by dipping, spraying, running the cord over a coated roll or other conventional procedure. The amount of latex added will be from about 2 to about 10 percent by weight of the cord. It is believed that the isocyanate groups on the modified tire cord react with the tire cord adhesive. The thus treated cord is then embedded in a vulcanizable tire stock and cured under pressure. The vulcanizable tire stocks in which the coated cord can be used as a reinforcing medium include natural rubber, and synthetic rubbers such as styrene—butadiene rubber, ethylene—propylene—diene terpolymer rubbers, polybutadiene, polyisoprene, and mixtures and blends thereof with suitable fillers, pigments, antioxidants, and cross-linking agents such as sulfur, dicumyl peroxide, etc.

Another typical example of bonding a polymer to a substrate using an azidoformate-isocyanate compound is the bonding of an alpha-olefin polymer such as polypropylene, to a glass substrate. Said glass substrate, such as glass cloth, is first treated with an amino silane compound. In so doing, the silane portion of the compound reacts with the substrate leaving the amine portion free for later reaction with the isocyanate portion of the azidoformate-isocyanate compound. Next polypropylene having been modified with an azidoformate-isocyanate compound so as to react the azidoformate portion or portions with the polymer leaving the isocyanate portion free is placed in contact with the above described treated glass. The free amine groups on the treated glass react with the free isocyanate groups on the modified polymer forming a tight bond between the polymer and glass substrate.

Still another typical example of bonding a polymer to a substrate using an azidoformate-isocyanate compound is the bonding of an alpha-olefin polymer to a metal substrate such as a steel sheet. The steel sheet will first be treated with a priming agent, such as an amino silane compound, which possesses a group or groups which will bond to the metal surface leaving a free functional group or groups which are capable of reaction with the isocyanate group or groups on the azidoformate-isocyanate compound. The process of bonding the alpha-olefin polymer to the steel sheet can be carried out in various ways. For example, the sheet can be coated with a solution or suspension of the priming agent, allowed to dry, then coated with a solution or suspension of the azidoformate-isocyanate compound, allowed to dry and finally contacted with the alpha-olefin polymer at the decomposition temperature of the azide. By another method, the sheet can be coated with the priming agent, then contacted with both the azidoformate-isocyanate compound and the alpha-olefin polymer at the decomposition temperature of the azide. By still another method, the priming agent, azidoformate-isocyanate compound and alpha-olefin polymer can be deposited together on the sheet and then heated.

The substrates to which the polymers may be bonded in accordance with this invention include siliceous materials such as glass, asbestos, sand, clay, concrete, brick, ceramic material, etc.; metals such as aluminum, cadmium, chromium, copper, magnesium, nickel, silver, tin, iron, titanium, zinc, etc.; alloys of the metals such as steel, brass, bronze, nickel chrome, etc. and including metals which have been surface treated with phosphates, chromates, etc. or on the surface of which oxides have formed; and other polymers. By the term "other polymers" is meant any polymer other than the polymer to which it is to be bonded. These substrates can be in various forms such as sheets, plates, blocks, wires, cloth, fibers, particles, etc.

The following examples will serve to illustrate the invention, all parts and percentages being by weight unless otherwise indicated.

EXAMPLE 1

This example illustrates the preparation of 5-isocyanatopentyl azidoformate.

To 85 parts of 6-chlorocarbonyloxyhexanoic acid was added 95 parts of thionyl chloride dropwise over a period of 40 minutes. During the addition the reaction temperature dropped from 25°C. to 15°C. The reaction mixture was then warmed to 45°C. for 2 hours and stirred overnight at room temperature. The reaction mixture was then stripped under vacuum of unreacted thionyl chloride to yield a yellow oil. This oil was vacuum distilled to give 69.7 parts of 6-chlorocarbonyloxyhexanoyl chloride. To a slurry comprising 79.5 parts of sodium azide, 150 parts water and 198 parts acetone was added 65 parts of the 6-chlorocarbonyloxyhexanoyl chloride dropwise with rapid stirring at a temperature of −5 to 0°C. After stirring for an additional 2 hours at 0°C., 200 parts of ice water and 350 parts of cold benzene were added. The organic layer was separated and washed three times with ice water. The resulting colorless product was dried over magnesium sulfate and then refluxed at a temperature of 80°C. for 1 hour. After removing the solvent 51 parts of 5-isocyanatopentyl azidoformate was obtained. A typical infrared spectrum of this product displayed a strong isocyanate peak at 2,270 cm$^{-1}$, a strong azide doublet at 2,135 cm$^{-1}$ and 2,180 cm$^{-1}$, as well as a strong carbonyl peak at 1,735 cm$^{-1}$. The results of an infrared analysis of the product for percent azido nitrogen and isocyanate is tabulated below:

|  | Calculated | Found |
|---|---|---|
| Azido nitrogen | 21.2 | 19.5 |
| Isocyanate | 21.2 | 17.9 |

EXAMPLE 2

This example illustrates the use of the 5-isocyanatopentyl azidoformate of Example 1 in bonding polyester tire cord to rubber tire stock.

Poly(ethylene terephthalate) tire cord 1,000 denier and 3 ply under about 500 grams of tension was passed twice through a trough containing a 5 percent solution of the 5-isocyanatopentyl azidoformate of Example 1 in trichloroethylene. The cord was next passed through two ovens in series at 200°F. and 400°F. Residence times in the ovens were 65 and 54 seconds respectively. The cord dip pick-up was approximately 1 percent by weight.

The modified cord was next dipped in a resorcinol formaldehyde latex prepared as follows: To a solution of 0.24 part of sodium hydroxide in 192.8 parts of water was added 8.8 parts of resorcinol with continued stirring until a complete solution was achieved. Then 12.2 parts of 37 percent formaldehyde was added. The solution was aged for approximately 5 hours at about 75°C. and then added slowly to a mixture of 48 parts water and 195 parts of a commercial latex comprising a terpolymer of styrene, butadiene and vinyl pyridine, the monomers being present in a ratio of approximately 50:70:15. The mixture was stirred slowly for 15 minutes and its pH adjusted to 10.3 using concentrated ammonium hydroxide. The resulting gray-violet latex contained approximately 20 percent solids. The isocyanate-azidoformate modified cord was passed twice through a trough of the above described latex under a tension of 500 grams and then dried and cured for 54 seconds at a temperature of 430°F.

The thus coated cord was then vulcanized with a rubber tire stock in the form of ⅜ inch H-specimens. The rubber tire stock has the following formulation:

| Compounds | Parts |
|---|---|
| Natural rubber (smoked sheet) | 80 |
| Styrene butadiene rubber | 20 |
| Semi-reinforcing furnace black | 25 |
| Zinc Oxide | 5 |
| Stearic acid | 2 |
| Polytrimethyl dihydroquinoline | 1 |
| Heavy pine tar | 0.5 |
| Benzothiazyl disulfide | 1 |
| Tetramethyl thiuram disulfide | 0.1 |
| Sulfur | 2.6 |

The test specimens were cured for 45 minutes at a temperature of 307°F. After several hours conditioning at room temperature of H-specimens were tested according to the procedure of ASTM D-2138-62T. An average (6 test specimens) of 36.6 pounds was required to overcome the tire cord-rubber adhesion. A control specimen treated exactly the same as above except for the azidoformate-isocyanate treatment gave an average of 16.8 pounds required to overcome the tire-cord-rubber adhesion.

EXAMPLE 3

This example illustrates the bonding of a nitrocellulose lacquer to polypropylene film using the 5-isocyanatopentyl azidoformate of Example 1.

Biaxially oriented crystalline polypropylene film 1 mil thick was coated with a 10 percent solution of 5-isocyanatopentyl azidoformate in toluene. The thus treated film was dried in a nitrogen atmosphere at 125°C. The add-on of isocyanatopentyl azidoformate was approximately 2 percent by weight. The thus treated film was coated with a commercial nitrocellulose lacquer. The solids formulation of the nitrocellulose lacquer was as follows:

| Compounds | Parts |
|---|---|
| SS/Nitrocellulose ½ sec. viscosity | 60 |
| Terpene-derived alkyd resins | 26 |
| Diisobutyl adipate | 0.25 |

The thus coated film was dried at a temperature of 120°C. and heat sealed at 130°C. for one-fourth of a second at 15 p.s.i. The nitrocellulose coating adhered very tightly to the polypropylene film having a peel strength of 105 pounds per inch. A control sample prepared exactly the same way except for the treatment with the 5-isocyanatopentyl azidoformate had a peel strength of 35 pounds per inch.

EXAMPLE 4

This example illustrates the preparation of p-isocyanatophenyl azidoformate.

To a slurry comprising 26 parts of sodium azide, 25 parts of water and 47 parts of acetone was added 22 parts of p-chlorocarbonyloxybenzoyl chloride with rapid stirring. After stirring for 3 hours at 3°C. the reaction mixture was diluted with 150 parts of ice water and 100 parts of cold benzene. The benzene layer was separated, washed with ice water 3 times and dried over magnesium sulfate. The dried solution of p-azidocarbonyloxybenzoyl azide was then refluxed for 6 hours in a nitrogen atmosphere to give the p-isocyanatophenyl azidoformate. The results of an infrared analysis of the product for percent azido nitrogen and isocyanate is tabulated below:

|  | Calculated | Found |
|---|---|---|
| Nitrogen | 20.6 | 19.5 |
| Isocyanate | 20.6 | 20.3 |

EXAMPLE 5

This example illustrates the use of a precursor of the p-isocyanatophenyl azidoformate, of Example 4, in bonding nitrocellulose lacquer to polypropylene film.

A sample of the biaxially oriented polypropylene film described in Example 3 was coated with a nitrocellulose lacquer emulsion containing the p-azidocarbonyloxybenzoyl azide described in Example 4. The composition of the lacquer part of the emulsion was as follows:

| Compounds | Parts |
|---|---|
| SS/Nitrocellulose 1/2 second | 25 |
| Terpene derived alkyd resins | 10 |
| Diisobutyl adipate | 5 |
| p-Azidocarbonyloxybenzoyl azide | 4 |
| Toluene | 20 |
| Methyl isobutyl ketone | 16 |
| Amyl acetate | 16 |
| Non-ionic surface active agent* | 4 |

* polyoxyalkylene derivative of sorbitan monolaurate

The above lacquer was emulsified with water in a ratio of 2.5 parts of lacquer to 1 part of water. The film coated with the above lacquer emulsion was dried at 50°C. in a stream of dry nitrogen and then heated to a temperature of 125°C. to decompose the azides and form the isocyanates. The treated film was then heat sealed at 130°C. for one-fourth second at 15 p.s.i. The peel strength of the nitrocellulose lacquer on the film was determined to be 90 pounds per inch. A control sample, prepared the same way except for the addition of the p-azidocarbonyloxybenzoyl azide had a peel strength of 35 pounds per inch.

EXAMPLE 6

This example illustrates the preparation of 3-(4-isocyanatophenoxy)propyl azidoformate.

To a slurry comprising 23.4 parts of sodium azide, 30 parts of water and 75 parts of acetone was added 25 parts of 4-(3-chlorocarbonyloxypropyloxy)benzoyl chloride with rapid stirring at a temperature of −5°C. After stirring for 3 hours at 0°C. 150 parts of ice water and 125 parts of cold benzene were added. The benzene layer was separated, washed 3 times with ice water and then dried over magnesium sulfate. The thus dried solution was refluxed for 7 hours. The solvent was removed from the solution to yield 3-(4-isocyanatophenoxy)propyl azidoformate. A typical infrared spectrum of this product displayed a strong isocyanate peak at 2260 cm$^{-1}$ and a strong azide peak at 2,135 cm$^{-1}$. The results of an infrared analysis of the product for percent azido nitrogen and isocyanate is tabulated below:

| | Calculated | Found |
|---|---|---|
| Nitrogen | 16.0 | 15.6 |
| Isocyanate | 16.0 | 15.2 |

EXAMPLE 7

This example illustrates the preparation of 4-isocyanatocyclohexyl azidoformate.

To a slurry comprising 33 parts of sodium azide, 50 parts of water and 75 parts of acetone was added 22.5 parts of 4-chlorocarbonyloxycyclohexanecarbonyl chloride with rapid stirring at a temperature of 0°C. After stirring for 2 hours at 3°C. 200 parts of ice water and 80 parts of cold benzene were added. The benzene layer was separated, washed with water 3 times and dried over magnesium sulfate. This 4-azidocarbonyloxycyclohexanecarbonyl azide solution was then heated to reflux for 5 hours to form the 4-isocyanatocyclohexyl azidoformate. Total yield was 86 percent of theoretical. The results of an infrared analysis of the product for percent azido nitrogen and isocyanate is tabulated below:

| | Calculated | Found |
|---|---|---|
| Nitrogen | 20.0 | 19.8 |
| Isocyanate | 20.0 | 19.5 |

EXAMPLE 8

This example illustrates the preparation of 11-isocyanato-1-n-hexylundecyl azidoformate.

To a solution of 30 parts of phosgene in 300 parts of dry tetrahydrofuran was added 30 parts of 12-hydroxystearic acid at a temperature of 0°C. After stirring at 3°C. for 19 hours, the reaction was warmed to room temperature and the solvent and excess phosgene removed under vacuum. The resulting chloroformate-carboxylic acid was separated and then refluxed with 100 parts of thionyl chloride in 167 parts of methylene chloride for 8 hours. The reaction mixture was then stripped under vacuum of unreacted thionyl chloride and solvent to give the bis-chloride. To a slurry comprising 40 parts of sodium azide, 25 parts of water and 175 parts of acetone was added 35 parts of the bis-chloride with rapid stirring at a temperature of 0°C. After stirring for 2½ hours at 3°C., 300 parts of ice water and 350 parts of cold benzene were added. The benzene layer was separated and washed three times with ice water and then dried over magnesium sulfate. The resulting solution was gently refluxed for 5 hours in a nitrogen atmosphere. The benzene solvent was then removed to yield the 11-isocyanato-1-n-hexylundecyl azidoformate. The results of an infrared analysis of the product for percent azido nitrogen and isocyanate is tabulated below:

| | Calculated | Found |
|---|---|---|
| Nitrogen | 11.4 | 10.9 |
| Isocyanate | 11.4 | 10.6 |

EXAMPLE 9

This example illustrates the cross-linking of an ethylene—propylene copolymer with 5-isocyanatopentyl azidoformate.

One hundred parts of an ethylene—propylene copolymer, containing 40 percent by weight of ethylene monomer and having a specific gravity of 0.86, was placed on a two-roll mill maintained at 80°C. and 6 parts of 5-isocyanatopentyl azidoformate was added. After thorough blending on the two-roll mill the mixture was removed and placed in a closed heated mold for 30 minutes at a temperature of 140°C. The thus modified copolymer was then heated in boiling water for 1 hour. The resulting product had been cross-linked as evidenced by its insolubility in hot toluene. A control sample treated exactly the same way except for the addition of 5-isocyanatopentyl azidoformate was completely soluble in hot toluene.

EXAMPLE 10

This example illustrates the modification of a polyester with 5-isocyanatopentyl azidoformate.

Test swatches 4½ by 10 inches of 100 percent poly(ethylene terephthalate) woven fabric, heat-set, spun Dacron type 54 were dipped in a methylene chloride solution of 5-isocyanatopentyl azidoformate. The methylene chloride solvent was evaporated to leave approximately 6 percent add-on of the azide-isocyanate compound. The thus treated swatches were sealed between glass plates and heated in an oven for 10 minutes at a temperature of 190°C. to cause reaction of the azidoformate groups with the polyester. The thus modified polyester fabric had the same appearance as the unmodified fabric.

The free isocyanato groups attached to the modified fabric were converted to amine groups by laundering the modified fabric in a home washing machine using a commercial detergent with a pH of 9. The thus modified fabric having free amine groups was tested for water retention by dipping samples of the swatches in water and draining. Water retention in the modified fabric was approximately 10 percent more than in the unmodified controls. Specular reflectance of a water drop placed on the modified fabric was observed to disappear in 1 to 2 minutes while a water drop placed on an unmodified control fabric remained more than 10 minutes.

Samples of the modified polyester fabric having free amine groups was coated with an aqueous solution of polacrylic acid and cured for 10 minutes at 130°C. The amount add-on of polyacrylic acid was approximately 1 percent. The polyacrylic acid (5 percent aqueous solution at 100°F.) had a viscosity of 2.3 centistokes. To demonstrate the retention of the polyacrylic acid on the fabric, samples of the modified swatches were laundered 5 times in a home washer using a commercial detergent. Samples of the polyacrylic acid modified fabric which had been laundered 5 times and samples which had not been laundered were dyed under the same conditions with malachite green. The laundered and unlaundered samples exhibited the same color and intensity of dye. Control samples of the polyester fabric which had not been treated with the azido-isocyanato compound or with the polyacrylic acid could not be dyed. From the above it can be seen that the polyacrylic acid is actually chemically anchored to the modified fabric.

EXAMPLE 11

This example illustrates the bonding of polypropylene to glass cloth using 5-isocyanatopentyl azidoformate.

Twelve ply laminates of glass cloth and polypropylene film were prepared using 181 style electrical glass woven cloth, heat cleaned and having a weight of 8.9 ounces per square yard, and 5 mil film of crystalline polypropylene. Sheets of the glass cloth were first immersed in a 0.5 percent aqueous solution of γ-aminopropyltriethoxysilane, dried at room temperature and then heated in a forced air oven at 120°C. for 1 hour. The thus treated cloth was immersed in a benzene solution containing 0.5 percent by weight of 5-isocyanatopentyl azidoformate for 4 hours. The sheets of cloth were then removed, air dried and laid up to form the laminate by alternating plies of the treated glass cloth and sheets of the polypropylene film. The resulting assembly was compression molded at a temperature of 220°C., for 5 minutes at contact pressure, 3 minutes at a pressure of 500 p.s.i. and then cooled to 23°C. under 500 p.s.i. to form a ⅛ inch thick laminate. A control laminate was prepared exactly as described above except for the treating with the 5-isocyanatopentyl azidoformate. Test specimens 1 inch by 3 inches were cut from the laminates and tested for flexural strength according to American Standard Testing Method D 790 in a 2 inch span at 0.05 inch/minute crosshead speed. The laminate treated with the azidoformate-isocyanate formate-isocyanate compound had a flexural strength approximately twice that of the control.

EXAMPLE 12

This example illustrates the bonding of a polymer to an aluminum panel using p-isocyanatophenyl azidoformate.

An aluminum panel 1 × 4 inches and one-sixteenth inch thick was cleaned, degreased in trichloroethylene vapor, etched with dilute chromic acid, washed with distilled water and dried. The panel was then primed by immersing in a 0.5 percent methanol-water solution of γ-aminopropyltriethoxysilane and dried in a forced air oven at 120°C. for 2 hours. The thus primed panel was dipped in a colloidal suspension of approximately 20–22 percent total solids crystalline polypropylene particles and containing about 0.75 percent by weight of p-isocyanatophenyl azidoformate, in benzene. The coated panel was air dried, baked at a temperature of 230°C. for 8 minutes and then allowed to cool. A control was prepared exactly as described above except for the addition of the p-isocyanatophenyl azidoformate. The coating on each panel was tested for adherence by scoring with a razor blade and then drawing the edge of a metal coin firmly across the thus scored surface. The coating on the panel containing the azidoformateisocyanate compound was not removed. The coating on the control panel stripped easily from the aluminum substrate.

What I claim and desire to protect by Letters Patent is:

1. A process of adhering a polymer to a substrate selected from siliceous materials, metals or other polymer substrated which comprises the steps of (1) modifying said polymer to introduce isocyanato groups by heating in contact with a small amount of an azidoformate-isocyanate compound having the formula

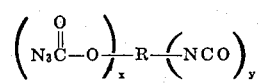

wherein R is a polyvalent organic radical selected from the saturated and unsaturated aliphatic, cycloaliphatic, and aromatic hydrocarbon, hydrocarbon-oxy-hydrocarbon, hydrocarbon-thio-hydrocarbon and hydrocarbon-sulfonyl-hydrocarbon polyvalent radicals and the corresponding halo-substituted radicals and x and y are integers from 1 to 10, and (2) coupling said modified polymer to said substrate through the isocyanato groups on said modified polymer.

2. The process of claim 1 wherein the said substrate has been primed with a material compatible with said substrate having free functional groups selected from amine and hydroxyl groups.

3. The process of claim 2 wherein said substrate has been primed with an amino silane compound.

4. The process of claim 1 wherein the said substrate is glass fibers.

5. In a process of adhering fibrous polyester reinforcing material to rubber stock, wherein the reinforcing material is embedded in said rubber stock, the improvement of first contacting said reinforcing material with an azidoformate-isocyanate compound having the formula

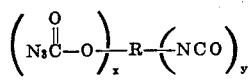

wherein R is a polyvalent organic radical selected from the saturated and unsaturated aliphatic, cycloaliphatic, and aromatic hydrocarbon, hydrocarbon-oxy-hydrocarbon, hydrocarbon-thio-hydrocarbon and hydrocarbon-sulfonyl-hydrocarbon polyvalent radicals and the corresponding halo-substituted radicals and x and y are integers from 1 to 10 and heating the thus contacted material to a temperature sufficient to cause substantial decomposition of the azidoformate groups on the azidoformate-isocyanate compound.

* * * * *

PO-1050
(5/69)

UNITED STATES PATENT OFFICE
CERTIFICATE OF CORRECTION

Patent No. U.S.P. 3,754,973     Dated    August 28, 1973

Inventor(s)    Harold M. Spurlin

It is certified that error appears in the above-identified patent and that said Letters Patent are hereby corrected as shown below:

Col. 2, Line 4
"isocyanatonane" -- should read -- "isocyanatononane"

Col. 2, Line 5
"azidorcarbonyloxybutyl" -- "azidocarbonyloxybutyl"

Col. 12, Line 6
"delete second occurrence of "formate isocyanate"

Signed and sealed this 20th day of November 1973.

SEAL)
.ttest:

:DWARD M.FLETCHER,JR                RENE D. TEGTMEYER
.ttesting Officer                   Acting Commissioner of Patents